United States Patent
Violette et al.

Patent Number: 5,129,787
Date of Patent: Jul. 14, 1992

[54] LIGHTWEIGHT PROPULSOR BLADE WITH INTERNAL SPARS AND RIGID BASE MEMBERS

[75] Inventors: John A. Violette, Granby; Eugene J. Delgrosso, Wallingford, both of Conn.

[73] Assignee: United Technologies Corporation, Hartford, Conn.

[21] Appl. No.: 655,510

[22] Filed: Feb. 13, 1991

[51] Int. Cl.⁵ .............................................. B64C 27/46
[52] U.S. Cl. .................................. 416/226; 416/217; 416/219 R; 416/229 A; 416/241 R; 416/241 A
[58] Field of Search ............... 416/223 R, 223 A, 224, 416/226, 229 R, 229 A, 230 R, 230 A, 241 R, 241 A, 204 R, 204 A, 217, 219 R

[56] References Cited

U.S. PATENT DOCUMENTS

| | | |
|---|---|---|
| 2,916,808 | 12/1959 | Wilkes, Jr. |
| 3,694,104 | 9/1972 | Erwin |
| 3,799,701 | 3/1974 | Rothman |
| 3,870,434 | 3/1975 | Paulson ............ 416/217 |
| 4,111,606 | 9/1978 | Prewo |
| 4,305,699 | 12/1981 | Martinelli ............ 416/226 |
| 4,643,647 | 2/1987 | Perry |
| 4,685,864 | 8/1987 | Angus et al. |
| 4,784,575 | 11/1988 | Nelson et al. |
| 4,810,167 | 3/1989 | Spoltman et al. |
| 5,017,092 | 5/1991 | Violette et al. ............ 416/204 A |
| 5,022,824 | 6/1991 | Violette et al. ............ 416/230 |

FOREIGN PATENT DOCUMENTS 1073330  9/1954  France ............ 416/224

*Primary Examiner*—Edward K. Look
*Assistant Examiner*—Christopher M. Verdier
*Attorney, Agent, or Firm*—William W. Habelt

[57] ABSTRACT

A lightweight propulsor blade (10) is constructed 10 of a hollow internal spar (30) and an exterior airfoil shell (20) which defines and encompasses a hollow interior cavity (26). The internal spar (30) is disposed within the cavity 26 and extends spanwisely from its tip portion to terminate in a spar root portion (40). The spar has at least forward and aft spanwisely extending, chordwisely spaced, hollow box-like cavities (52A, 52B), a leading edge shear web (53) projecting chordwisely forward from the forward cavity (52A), a trailing edge shear web (55) projecting chordwisely rearward from the aft cavity (52B), and an intermediate chordwise shear web (57) spanning the space between and interconnecting the forward and aft cavities (52A, 52B). An additional intermediate box-like cavity (52C) may be incorporated in the intermediate chordwise shear web (57) in spaced relationship between the forward and aft cavities (52A, 52B).

24 Claims, 4 Drawing Sheets

LIGHTWEIGHT PROPULSOR BLADE WITH INTERNAL SPARS AND RIGID BASE MEMBERS

TECHNICAL FIELD

This invention relates generally to blades for use on rotary machines and, more particularly, to propulsor blades for use on turboprop and turbofan engines for aircraft, including aft mounted unducted counterrotating turbofan engines.

BACKGROUND ART

In aircraft applications it is highly desirable to minimize the weight of aircraft components as every pound saved in aircraft weight translates to fuel savings and/or greater payload capacity. With respect to turboprop or turbofan engine components, it is well appreciated that the propulsor blades are the most likely candidate for weight reduction since the weights of other related components, e.g. blade retention means, pitch change mechanisms, hub disks, shafts and bearings, are typically directly dependent upon the magnitude of the blade centrifugal loading borne by these components. The propulsor blades per se, however, can be made lighter in weight so long as the centrifugal pull, bending moments, torsion loads and vibratory loads, imposed upon the blades during operation are effectively transmitted to the blade retention means for distribution to the aforenoted load bearing components.

It is known in the art to produce lighter weight propulsor blades of a built-up construction wherein a blade is formed of outer shell made of lightweight composite material, and an internal load bearing spar which is bonded to the interior surface of the shell and extends from within the shell cavity to terminate beyond the shell in a root end which is adapted to be mounted to a suitable blade retention means. Examples of such composite blades are presented in U.S. Pat. Nos. 3,799,701; 4,784,575 and 4,810,167.

The composite fan blade disclosed in U.S. Pat. No. 3,799,701 is formed of two complementary preformed outer airfoil planform shell halves which are bonded together at their outer tips, leading edges and trailing edges about a solid load bearing spar to form an outer shell encompassing all of the load bearing spar except the root portion thereof which extends beyond the shell. The shell halves are fabricated from a composite material having a relatively high modulus of elasticity, such as boron epoxy, boron-aluminum or carbon, and are bonded along their interior surface to the outer surface of the spar sandwiched therebetween. The solid load bearing spar, which is made of titanium, has an integral dovetail root end which is adapted to mount in a blade retention disc or hub for transmitting load from the blade shell, carried through the spar, to the retention disc or hub.

U.S. Pat. No. 4,784,575 discloses a propulsor blade for a counterrotating unducted propfan system wherein a metallic spar is sandwiched between and bonded to two composite material shell halves which, when disposed about the central spar, form the airfoil shell and define hollow forward and aft airfoil cavities. These airfoil cavities, which are filled with lightweight foam material, result in a reduction in the weight of the blade. The composite shell halves are built-up from layers of graphite, boron or S-glass fibers embedded in an thermosetting epoxy resin matrix. The spar, which is made of a high strength, light weight metal or alloy, such titanium or aluminum, has a integral dovetail root end which is adapted to mount in a blade retention disc or hub for transmitting load from the blade shell, through the spar, to the retention disc or hub. The weight of the blade is further reduced by milling cavities within the spar while maintaining the complete surface area of the spar available as a bonding surface to which the composite shell halves are mounted to establish the structural integrity of the blade.

The composite aircraft propulsor blade disclosed in U.S. Pat. No. 4,810,167 is formed of an outer shell of composite material, specifically an epoxy resin impregnated woven fabric made of graphite fibers, which encompasses a support structure also constructed of composite materials. This inner support structure is built-up from a rigid base plug at its root which defines a cavity for supporting a foam core that extends outwardly from the base plug to form a subassembly which is wrapped in layers of unidirectional graphite fibers bonded together by epoxy resin. The outer plies of these graphite fibers are generally parallel to the longitudinal blade axis and extend around the base plug. The end of the base plug, wrapped with these graphite fibers, is adapted to be mounted within a dovetail slot in the blade retention hub or disc. Metal surfaces are bonded to the outer ply of graphite fibers passing around the base plug to protect the plies from being damaged by the lip surfaces of the hub retention slot. The graphite fibers which encompass the foam core and base plug form a load bearing spar which transfers centrifugal and bending loads from the blade to the retention hub, as well as providing torsional stiffness. The outer composite shell provides surface durability and additional torsional stiffness.

In commonly-assigned, co-pending application Ser. No. 07/255,099, filed Oct. 7, 1988, there is disclosed a lightweight prop-fan propulsor blade which is adapted to be pinned to a hub retention member. As the aforementioned blades, this blade is of a spar and shell type construction. The spar, which forms the main load bearing member of the blade, formed of a core constructed of graphite, Kevlar or fiberglass composite material, the core being received at its base within a root fairing to form a subassembly which is wrapped with multiple layers of graphite fibers bonded at their ends to opposite sides of the core and extending around the bottom of the root fairing. This spar is sandwiched between and bonded to the interior surface of an outer composite shell which encompasses the spar and defines forward and aft cavities which are filled with lightweight foam. The outer shell of the blade is formed by mating shell halves made of fiberglass cloth impregnated with a thermosetting epoxy resin. The root fairing defines a hollow core through which a cylindrical metal bushing extends to provide a pin receiving socket which facilitates mounting the blade by means of a pin to a retention member which is rotatably mounted to the retention hub thereby permitting the pitch of the blade to be changed upon rotation of the retention member.

Disclosure of Invention

It is a general object of the present invention to provide an improved propulsor blade of lightweight shell and spar construction.

It is a further object of the present invention to provide a lightweight propulsor blade having a hollow shell and hollow spar construction, with or without lightweight foam filling or honey-comb lattice disposed in the hollow cavities within the shell and the spar.

It is also an object of the present invention to provide a lightweight propulsor blade exhibiting improved torsional stiffness.

It is a still further object of the present invention to provide a lightweight propulsor blade having a hollow spar having increased resistance to buckling.

The propulsor blade of the present invention comprises an outer shell defining an airfoil and encompassing an interior cavity, and a load bearing spar member having a tip portion disposed within the interior cavity of the shell and spanwisely extending side portions bonded to the interior surface of the shell and extending from the tip of the spar member to a root portion thereof which extends beyond the shell. The spar comprises at least a forward elongated box-like member and an aft box-like member, each defining a hollow interior cavity, spanwisely extending in chordwisely spaced relationship from the tip of the spar to the root of the spar, a forward chordwise web extending spanwisely along the leading edge surface of the forward box-like member, an aft chordwise web extending spanwisely along the trailing edge surface of the aft box-like member, and an intermediate chordwise web extending between and interconnecting the forward and aft box-like members. These webs may extend completely to the spar tip or may gradually blend to form a solid spar tip as the blade airfoil becomes thinner approaching the blade tip. In some cases with thin blades, the outer fifty percent or more of the spar may be solid thereby increasing foreign object impact resistance.

The root portion of the spar comprises means for mounting to a retention member for attachment of the blade to a propulsor hub. To provide additional strength and rigidity to the root portion of the hollow spar structure, a rigid base member is disposed within the root end of the spar cavities. The rigid member bridges the cavity between the opposite lateral surfaces of the cavity and serves to transfer load from the blade spar to the retention member to which the blade is mounted and also to react loads developed between the spar root and the retention member. Additionally, a lightweight foam filler or honey-comb lattice may be disposed within the hollow cavity of the box-like member to fill or partially fill the region of the cavity above the rigid base member.

BRIEF DESCRIPTION OF DRAWINGS

These and other objects, features and advantages of the present invention will become more apparent in light of the detailed description of the best mode embodiments thereof, as illustrated in the accompanying drawing, wherein.

BEST MODE FOR CARRYING OUT THE INVENTION

Figure 1:
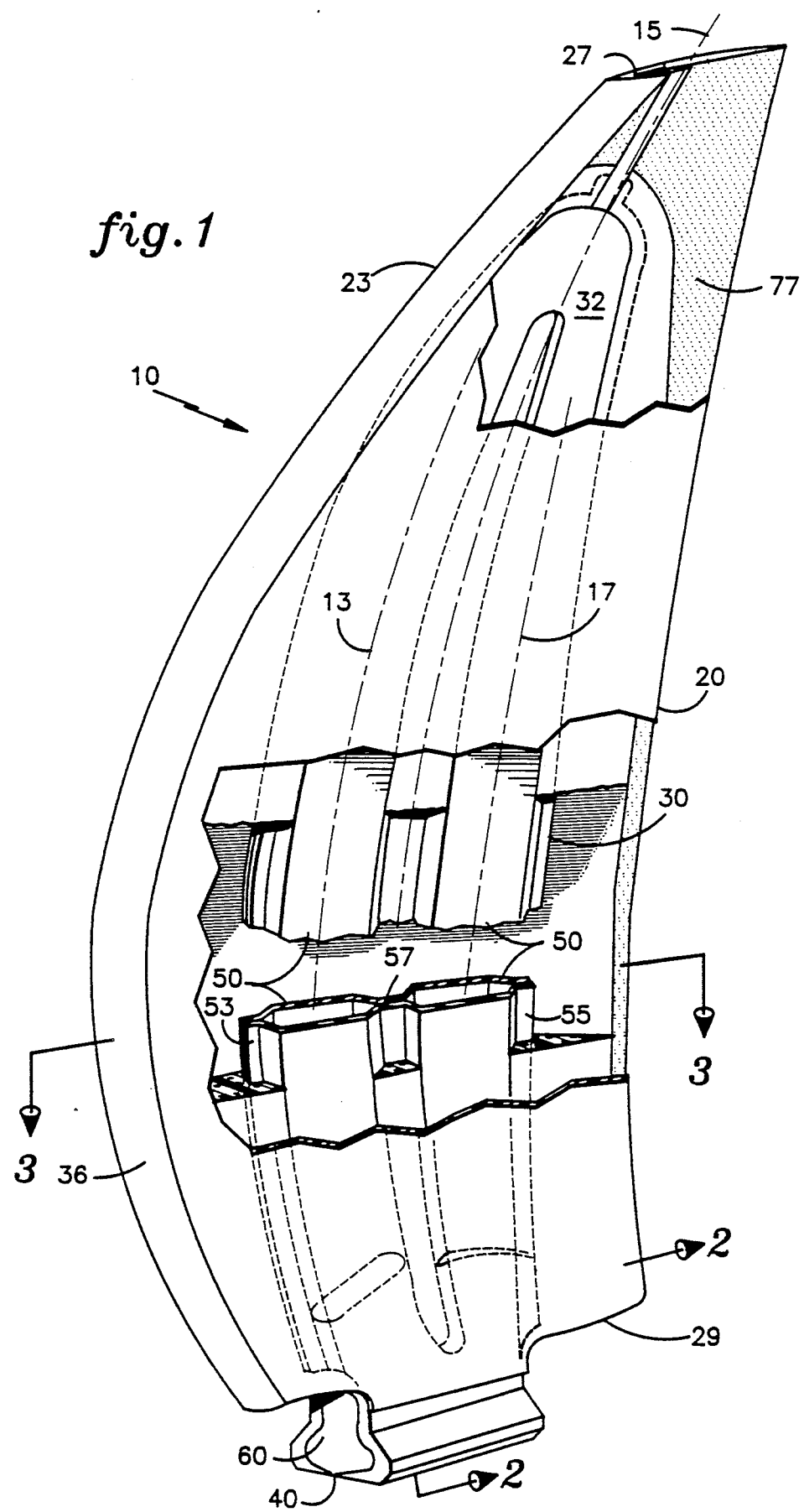
FIG. 1 is a perspective view, partly in section, of a propulsor blade of the present invention provided with a dovetail root for attaching the blade to a retention member.

Referring now to the drawing, there is depicted a propulsor blade 10 of shell and spar construction made lightweight through the use of a hollow shell 20 and hollow spar 30. The embodiment of the blade 10 depicted in FIGS. 1 and 2 incorporates a spar 30 which has a root 40 which has a dovetail end member adapted for insertion into a similarly dovetail shaped receiving slot in the blade retention hub (not shown) of a prop-fan or turbo-fan engine, while the embodiment of the blade 10 depicted in FIGS. 3 and 4 incorporates a spar 30 which has a root 40 which incorporates pin socket means by which the blade may be pinned as in conventional practice with a cylindrical pin to a rotatable retention member 100 in the retention hub (not shown) of a prop-fan engine. It is to be understood that these embodiments of the spar root are presented for purposes of illustration not limitation, and that the spar root 40 of the blade 10 may be designed to accommodate other retention techniques, such as, for example, the rocker pin type retention disclosed in commonly assigned copending application Ser. No. 422,190, filed Oct. 16, 1989.

Irrespective of the spar root design, the blade 10 of the present invention comprises a hollow internal spar 30 and an exterior airfoil shell 20 which defines and encompasses a hollow interior cavity 26. The exterior shell 20 has a leading edge 23, a trailing edge 25, a tip end 27 and a root end 29. Most advantageously, the shell 20 is constructed from two shell halves 22 and 24 which are either bonded together with adhesive 77, or integrally molded, in mating relationship along their corresponding leading and trailing edges and at their tips to define the hollow interior cavity 26. The shell halves 22 and 24 define an airfoil surface having both pressure and suction sides.

The internal spar 30 is sandwiched between the shell halves 22 and 24 with its tip portion 32 disposed within the hollow interior cavity 26 and extends spanwisely inward from its tip portion through the cavity 26 to terminate in a spar root portion 40 which is disposed in, and may extend beyond, the root end 29 of the shell 20 depending upon the method of blade retention to be utilized when mounting the blade 10 to the prop-fan hub. Depending upon blade thickness distribution relative to the wall thickness of the shell halves 22 and 24, the tip of the spar 30 may be displaced inwardly from the tip end of the shell 20. That is, the spar 30 may be foreshortened rather than extending to the outboard end of the blade tip, and the two shell halves 22 and 24 joined directly together over the outboard end of the blade 10 to a lesser or greater extent. In any case, the internal spar 30 and the exterior shell 20 are bonded together with conventional high strength adhesive 71 along their interfacing surfaces, that is along the interfacing portions of the outer surface of the spar 30 and the interior surfaces of the hollow shell 20.

Typically, the spar 30 will be substantially narrower in a chordwise direction than the width of the hollow interior cavity 26. Thus, the spar 30 will not occupy all of the volume of the cavity 26 encompassed by the shell 20, but rather a hollow forward volume will exist in the cavity 26 between the leading edge 23 of the shell 20 and the forward edge of the spar 30, and a hollow rearward volume will exist in the cavity 26 between the trailing edge 25 of the shell 20 and the rearward edge of the spar 30. Also, small hollow volumes will exist midchord, between the internal spar webs and the outer shell halves 22 and 24. Although these hollow cavities could be left empty, it is preferable to provide a lightweight honeycomb reinforcement structure within these cavities, and/or to fill these hollow cavities with a lightweight foam material 38.

Preferably, the two shell halves 22 and 24 are made of lightweight composite material formed by known techniques, for example by laying up fiberglass cloth impregnated with thermosetting resins or transfer resin molding of layered fabric preforms. It is to be understood, however, that the shell halves 22 and 24 may be formed of any lightweight material without departing from the spirit and scope of the present invention, including without limitation such lightweight composite materials as boron epoxy, graphite epoxy, or fiber reinforced resins, or even lightweight metallic materials, e.g. aluminum, titanium, boron-aluminum or a fiber reinforced aluminum matrix. Additionally, the leading edge 23 of the exterior shell 20 may advantageously be covered with a metal sheath 36, such as a titanium or electroformed nickel sheath, which is bonded to the leading edge 23 of the shell 20 and rearwardly over a portion of both the pressure and suction sides of the blade 10 to protect the leading edge portion of the blade 10 from erosion and foreign object damage.

The internal spar 30 of the blade 10 of the present invention is comprised of two lateral half members 33 and 35, one forming the suction side of the spar and the other forming the pressure side of the spar, which halves are bonded together back to back to form the spar 30. Each of the spar half members 33 and 35 is tapered in thickness from its root end to its tip end with the plates being their thickest at the root end where the centrifugal, steady and cyclic bending and twisting loads are concentrated. Each spar half member 33 and 35 comprises a spanwisely elongated plate having at least two spanwisely extending, chordwisely spaced ribs 37 formed therein. The chordwisely spaced ribs 37 extend generally parallel to the spanwise axis 15 of the blade and are most advantageously spaced inwardly from, rather than abutting, the leading or trailing edges of the plate-like members 33 and 35, such that there is a leading edge tab 43 extending chordwisely outward toward the leading edge of the ribbed plate-like members 33 and 35, and a trailing edge tab 45 extending chordwisely outward toward the trailing edge of the ribbed plate-like members 33 and 35, and an intermediate tab 47 extending chordwisely between and interconnecting each pair of neighboring ribs 37.

Figure 4:
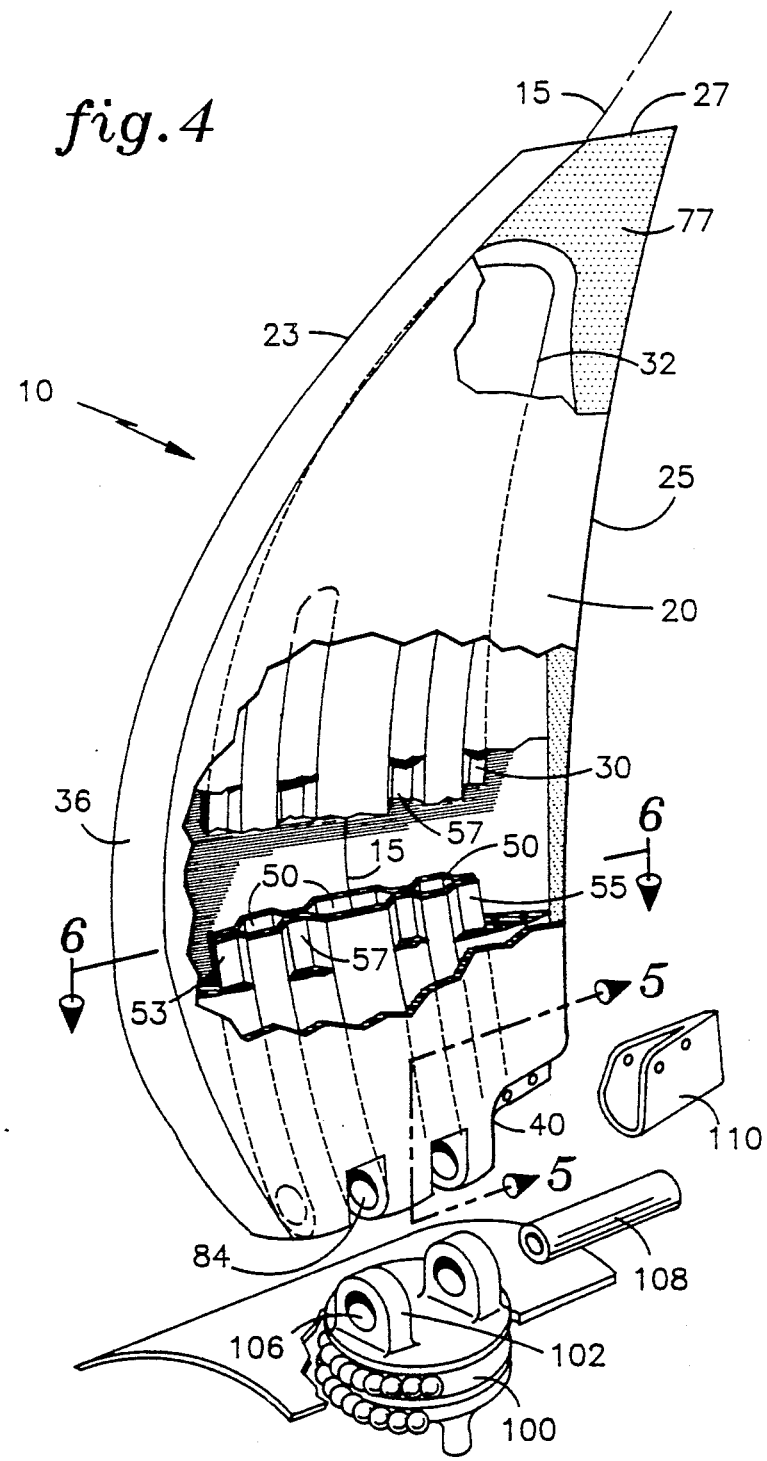
FIG. 4 is a perspective view, partly in section, of a propulsor blade of the present invention provided with a pin-root for attaching the blade to a retention member.
Figure 5:
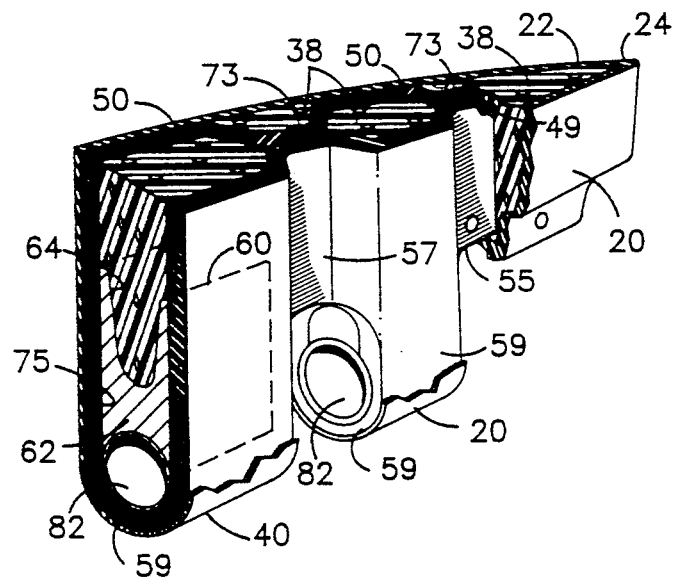
FIG. 5 is a sectioned perspective view taken along line 5—5 of FIG. 4.
Figure 6:
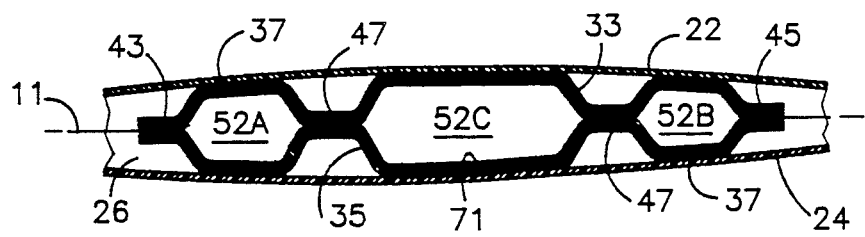
FIG. 6 is a cross-section plan view taken along line 6—6 of FIG. 4.

The spar 30 is assembled by bonding, or integrally molding or superplastically forming, the two spar half members 33 and 35 together in back to back relationship to mate corresponding ribs and webs to form a spar having at least two spanwisely extending, chordwisely spaced, torsion box members 50 defining hollow box-like cavities 52 including a forward cavity 52A extending about a spanwise axis 13 spaced chordwisely forward of the spanwise axis 15 of the blade 10 and a rearward cavity 52B extending about a spanwise axis 17 spaced chordwisely aft of the spanwise axis 15 of the blade 10, a spanwisely extending leading edge shear web 53 projecting chordwisely forward from the forward surface of the forward cavity 52A, a spanwisely extending trailing edge shear web 55 projecting chordwisely rearward from the rearward surface of the aft cavity 52B, and an intermediate chordwise shear web 57 spanning the space between and interconnecting the forward and aft box-like cavities 52A and 52B. One or more intermediate box-like cavities 52C may be provided by incorporating an additional torsion box or boxes in the intermediate chordwise shear web 57 in spaced relationship between the forward and aft box-like cavities 52A and 52B as illustrated in FIGS. 4-6.

When the spar half members 33 and 35 are assembled together, the mating forward tabs 43 form the leading edge shear web 53 of the spar 30, the mating rearward tabs 45 form the trailing edge shear web 55, the mating intermediate tabs 47 form the intermediate shear web or webs 57, as the case may be. Most advantageously, the spar half members 33 and 35 are mated with the interfacing surfaces 49 of their leading edge tabs 43, trailing edge tabs 45 and intermediate tabs 47 lying along the airfoil mean chamber line 11, thereby ensuring that the shear webs 53, 55 and 57 are positioned near the neutral axis for blade flatwise vibratory bending and assuring low bending stress in the shear webs. The two spar half members are bonded together along the interfacing surfaces of the forward tabs 43, the rearward tabs 45 and the intermediate tabs 47 of the respective half members. Further, the spaced ribs 37 in the spar half members align to form the hollow, box-like cavities 52 of the spar 30. The cavities 52, being box-like in shape, serve to substantially increase the torsional stiffness of the lightweight blade 10 of the present invention. Additionally, a lightweight foam filler 38 may be disposed within the hollow box-like cavities 37 of the spar 30 to fill or partially fill the region of the cavity above the rigid bridge member 60.

To bolster the strength and rigidity of the root portion of the hollow spar 30 of the present invention, a rigid bridge member 60 is disposed in the root portion 40 of each hollow box-like cavity 37 in the spar 30. Each rigid bridge member 60 is bonded with adhesive 75, or if the spar and bridge are metal may be diffusion-bonded or braze-bonded in place, to the opposite lateral interior surfaces of the spar half members defining the cavity. Each member 60 bridges the cavity 37 and thus serves to transfer load from the blade spar 30 to the hub retention member to which the blade 10 is mounted and also to react loads developed between the spar root 34 and the retention member. The rigid bridge member 60 also incorporates means for attaching the blade 10 to the hub retention member, with the particular configuration of the attachment means depending upon the design of the hub retention member to which the blade 10 is to be mounted.

Figure 2:
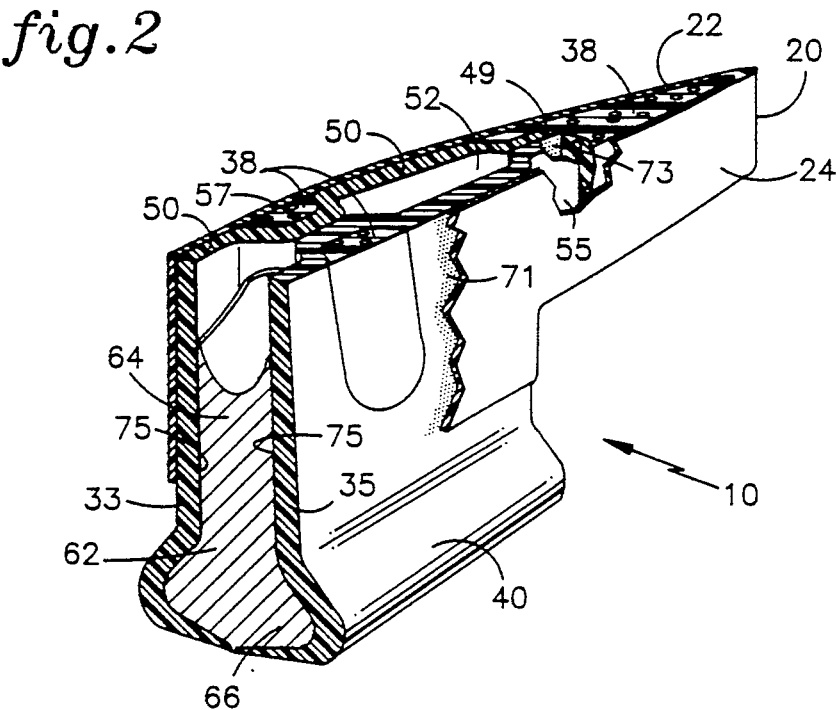
FIG. 2 is a sectioned perspective view taken along line 2—2 of FIG. 1.
Figure 3:
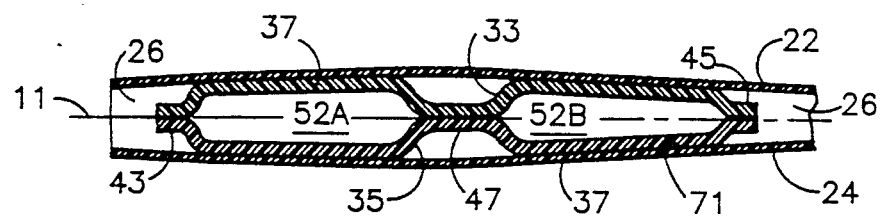
FIG. 3 is a cross-section plan view taken along line 3—3 of FIG. 1.

Referring now specifically to FIGS. 1-3, in the blade 10 of the present invention depicted therein, the internal spar 30 is formed with two spanwisely extending, chordwisely spaced, hollow box-like cavities 52A and 52B, cavity 52A being disposed forward of the spanwise blade axis 15 and cavity 52B being disposed rearward of the spanwise blade axis 15, a single intermediate chordwise shear web 57 extending along the mean chamber line of the airfoil and interconnecting the cavities 52A and 52B, a spanwisely extending leading edge shear web 53 projecting chordwisely forward from the forward surface of the forward cavity 52A, and a spanwisely extending trailing edge shear web 55 projecting chordwisely aft from the rearward surface of the rearward cavity 52B. Advantageously, the root portions of the two spar half members 33 and 35 extend beyond the shell 20 to wrap around the rigid bridge member 60. The portions of the spar half members 33 and 35 wrapping around the rigid bridge member 60 are bonded thereto with an adhesive agent 75 or diffusion or braze bonded. The shell half members 33 and 35 may be formed from separate plates which are bonded together back-to-back at their tip ends and along the interfacing surfaces of their tabs and wrapped at their root ends around the bridge member 60 to merely lie in juxtaposition on the end face of the distal end 66 of the bridge member 60 as shown in FIG. 2, or may be welded, diffusion-bonded, braze-bonded or otherwise bonded together thereat. Alternatively, the shell half members 33 and 35 may be fabricated on opposite ends of a single continuous plate which is wrapped around the distal end 66 of the bridge member 60 and the ends thereof thereafter bonded together as hereinbefore described.

In this embodiment, the blade 10 is adapted to be mounted to a conventional dovetail retention slot in a rotating hub (not shown) of a typical fixed-pitch turbo-fan engine. The rigid base member 60 has a body 62 which extends chordwisely beneath the intermediate shear web 57, spaced side members 64 which extend upwardly at the ends of the body 62 into the spar cavities 52 bordering the intermediate shear web 57, and a distal end 66 which extends beyond the shell 20. The side members 64 which extend into the cavities 52 are bonded to the interior lateral surfaces of the spar half members defining the cavity with adhesive 75 and, advantageously, may be cupped to ease the load transition and minimize stress concentrations at the edge of the bond joint. To facilitate mounting of the blade 10 into a retention slot, the distal end 66 of the bridge member 60 terminates in a dovetail shaped member which constitutes the attachment means. Advantageously, the two spar half members 33 and 35 extended beyond the shell 20 and wrap around the dovetail shaped member following the contour of the dovetail shaped member. To mount the blade 10 to the rotating hub of a turbo-fan engine, the dovetail root of the blade 10, defined by the dovetail shaped member and the portion of the spar wrapping the member, is inserted into a compatibly shaped retention slot in the rotating hub.

Referring now specifically to FIGS. 4–6, in the blade 10 of the present invention depicted therein, the internal spar 30 is formed with three spanwisely extending, chordwisely spaced, hollow box-like cavities 52A, 52B and 52C, cavity 52A being disposed forward of the spanwise blade axis 15 and cavity 52B being disposed rearward of the spanwise blade axis 15, and cavity 52C being disposed intermediate of cavities 52A and 52B along the spanwise blade axis 15, a first intermediate chordwise shear web 57 extending along the mean chamber line of the airfoil and interconnecting the cavities 52A and 52C, a second intermediate chordwise shear web 57 extending along the mean chamber line of the airfoil and interconnecting the cavities 52B and 52C, a spanwisely extending leading edge shear web 53 projecting chordwisely forward from the forward surface of the forward cavity 52A, and a spanwisely extending trailing edge shear web 55 projecting chordwisely aft from the rearward surface of the rearward cavity 52B. Advantageously, the root portions 40 of the two spar half members 33 and 35 have strap portions 59 extending beyond the shell 20 to wrap around the pin bushings or metal ferrules 82. These strap portions of the spar half members 33 and 35 also wrapping around the rigid bridge member 60 are bonded thereto with an adhesive agent 75 or diffusion bonded or brazed. The spar half members 33 and 35 are be fabricated on opposite ends of a single continuous plate which is wrapped around the bridge member 60 and the ends thereof are thereafter bonded together as herein before described.

In this embodiment, the blade 10 is adapted to be mounted to a conventional pin retention member 100 in a rotating hub of a typical variable-pitch prop-fan engine or fixed pitch turbo-fan engine. The rigid bridge member 60 has a body 62 which extends chordwisely beneath the intermediate shear webs 57, spaced members 64 which extend upwardly at the middle and the ends of the body 62 into the three spar cavities 52, and a distal end which houses at least one, and typically two or more, tubular ferrules 82 which define a pin receiving socket 84. The spaced members 64 which extend into the cavities 52 are bonded to the interior lateral surfaces of the spar half members defining the cavities with adhesive and, advantageously, may be cupped to ease the load transition and/or stiffness change from the outer hollow span structure to the more solid, yet slotted, retention structure, thereby reducing stress concentrations in the transition zone, as well as in the bond joint.

The blade 10 of this embodiment is adapted to be pinned to a retention member, such as a rotatable retention sleeve 100, as illustrated in FIG. 4. The retention sleeve 100 includes a pair of retention tenons 102 which define pin sockets 106. A pair of mortise sections are provided in the root end 40 of the blade and extend through the tubular ferrules 82 such that the root of the blade 10 may be positioned on the retention sleeve 100 with the tenons 102 being received into the mortise sections 68 such that the pin sockets 106 in the tenons 102 align with the pin receiving socket 84 in the root end 40 of the blade 10. With the blade 10 so positioned, a retention pin 108 is inserted into the ferrules 82 to pass through the pin receiving socket 84 and the pin sockets 106 thereby mounting the blade 10 to the rotatable retention sleeve 100 of the rotating hub of a prop-fan engine. Advantageously, a pin cover panel 110 is detachably secured to the trailing edge of the root portion of the shell 20 to provide an aerodynamic cover over the access to the retention pin.

In any embodiment of the blade 10 of the present invention, it is preferred that the spar 30 be made of a high strength material, preferably a high strength metal such as titanium, aluminum or steel, and mixtures thereof, although the spar 30 may be of multiple layers of advanced composite materials such as graphite fibers provided that the resultant spar has sufficient strength for the application in which the blade 10 is to be used. Depending upon the stress level, the rigid bridge member 60 may be fabricated from metal such as aluminum, titanium, and/or steel, or molded from thermoplastic material or thermosetting plastic material, such as epoxy resin, which may advantageously be reinforced with chopped fibers, including metal fibers, graphite fibers and/or high tensile strength aramid fibers, e.g. Kevlar fibers commercially available from E. I. Du Pont de Nemours & Company and mixtures thereof. The adhesive agents 73 and 75 used for joining the spar half members together and for bonding the spar members to the bridge member may be an epoxy resin or thermoplastic adhesive for most applications irrespective of the material used in fabricating the spar 30. However, in applications where the stress to be experienced in operation dictates that high strength metal materials be used in fabricating the spar and a higher strength bond is required, the spar half members may be joined together, and the spar members bonded to the bridge member, by fusion bonding, that is with a braze-bonded joint or a diffusion-bonded joint. Most preferably, the spar half members are fabricated from superplastic formed titanium fusion bonded together along the interface of the shear webs, during or after the superplastic forming process, with diffusion-bonded or braze-bonded titanium, or diffusion-bonded or braze-bonded aluminum, with the bridge member being formed of aluminum or titanium and fusion bonded to the titanium spar half members with diffusion-bonded or braze-bonded aluminum, or diffusion-bonded or braze-bonded titanium.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A propulsor blade comprising:
   a. an external shell having a leading edge, a trailing edge, a tip end, a root end, a first airfoil pressure surface extending on one side of the blade in a chordwise direction between the leading edge and the trailing edge and in a spanwise direction between the tip end and the root end, and a second airfoil suction surface extending on the other side of the blade in a chordwise direction between the leading edge and the trailing edge and in a spanwise direction between the tip end and the root end, each of said airfoil surfaces having an interior surface enveloping a hollow interior cavity defined within said shell;
   b. a load bearing spar extending from a tip end disposed within the hollow interior cavity of said shell in a spanwise direction to a root end adapted for mounting to a blade retention means, said spar having at least a forward spanwisely elongated torsion box member and a rearward spanwisely elongated torsion box member spaced chordwisely aft of said forward torsion box member, a leading edge chordwise shear web projecting chordwisely forward from said forward torsion box member, a trailing edge shear web projecting chordwisely aft from said rearward torsion box member, and an intermediate chordwise shear web disposed between said forward and rearward torsion box members, each of said forward and rearward torsion box members defining a hollow internal cavity portion within said spar and having spanwisely extending side portions bonded to the interior surfaces of said shell; and
   c. a rigid base member disposed within the root portion of said spar and filling the hollow internal cavity portions defined within said spar.

2. A propulsor blade as recited in claim 1 further comprising a first internal shell cavity formed in the hollow interior shell cavity forward of said spar and a second internal shell cavity formed in the hollow interior shell cavity rearward of said spar when said spar is disposed within the hollow interior shell cavity.

3. A propulsor blade as recited in claim 2 wherein a lightweight honeycomb lattice is disposed within at least one of the first and second internal shell cavities.

4. A propulsor blade as recited in claim 2 wherein a lightweight foam filler is disposed within at least one of the first and second internal shell cavities.

5. A propulsor blade as recited in claim 1 wherein the root portion of said spar defines retention means for mounting said propulsor blade to a blade retention member.

6. A propulsor blade as recited in claim 5 wherein said retention means comprises a dovetail shaped means at a distal end of the root portion of said spar.

7. A propulsor blade as recited in claim 6 wherein said dovetail shaped retention means comprises the distal end of said rigid base member.

8. A propulsor blade as recited in claim 5 wherein said retention means comprises a pin receiving socket means at a distal end of the root portion of said spar.

9. A propulsor blade as recited in claim 8 wherein said pin receiving socket means comprises a chordwisely extending tubular ferrule disposed at the distal end of said rigid base member.

10. A propulsor blade as recited in claim 1 further comprising at least one intermediate spanwisely elongated torsion box member disposed in spaced relationship between said forward and said rearward torsion box members, and interconnected with said forward torsion box member by a first forward portion of said intermediate shear web and with said rearward torsion box member by a second rearward portion of said intermediate shear web, said intermediate torsion box member defining an additional hollow internal cavity in said spar.

11. A propulsor blade as recited in claim 1 wherein said external shell is fabricated of lightweight composite material.

12. A propulsor blade as recited in claim 11 wherein said external shell is fabricated of multiple layers of fiberglass fabric embedded in a resin matrix.

13. A propulsor blade as recited in claim 1 wherein said spar is made of a high strength metal.

14. A propulsor blade as recited in claim 1 wherein said spar is made of graphite fibers.

15. A lightweight load bearing subassembly for disposing within an interior cavity defined by an exterior blade shell of a propulsor blade for transferring loads imposed upon the blade to a retention member, comprising:
   a. a load bearing spar extending from a tip end in a spanwise direction to a root end adapted for mounting to the blade retention member, said spar having at least a forward spanwisely elongated torsion box member and a rearward spanwisely elongated torsion box member spaced chordwisely aft of said forward torsion box member, a leading edge chordwise shear web projecting chordwisely forward from said forward torsion box member, a trailing edge shear web projecting chordwisely aft from said rearward torsion box member, and an intermediate chordwise shear web disposed between said forward and rearward torsion box members, each of said forward and rearward torsion box members defining a hollow internal cavity portion within said spar and having spanwisely extending side portions providing surface means for bonding to the interior surfaces of said shell; and b. a rigid base member disposed within the root portion of said spar and filling the hollow internal cavity portions defined within said spar, said rigid base member having a distal end defining retention means for mounting said blade to the retention member.

16. A lightweight load bearing blade subassembly as recited in claim 15 wherein said rigid base member has a dovetail shaped distal end comprising blade retention means disposed in the root portion of said spar.

17. A lightweight load bearing blade subassembly as recited in claim 16 wherein said spar is fabricated of two shell halves made of high strength metal selected from the group consisting of titanium, aluminum, steel and mixtures thereof and bonded back to back by fusion bonding, and said rigid base member is made of aluminum or titanium and is fusion bonded to said shell halves.

18. A lightweight load bearing blade subassembly as recited in claim 17 wherein a lightweight foam filler is disposed within at least one of the internal shell cavities.

19. A lightweight load bearing blade subassembly as recited in claim 15 further comprising at least one intermediate spanwisely elongated torsion box member disposed in spaced relationship between said forward and said rearward torsion box members, and interconnected with said forward torsion box member by a first forward portion of said intermediate shear web and with said rearward torsion box member by a second rearward portion of said intermediate shear web, said intermediate torsion box member defining an additional hollow internal cavity in said spar.

20. A lightweight load bearing blade subassembly as recited in claim 19 wherein said rigid base member has a chordwisely extending tubular ferrule comprising pin socket receiving means disposed in the root portion of said spar for mounting to the blade retention member.

21. A lightweight load bearing blade subassembly as recited in claim 20 wherein said spar is fabricated of two shell halves made high strength metal selected from the group consisting of titanium, aluminum, steel and mixtures thereof and bonded back to back by fusion bonding, and said rigid base member is made of aluminum or titanium and is fusion bonded to said shell halves.

22. A lightweight load bearing blade subassembly as recited in claim 20 wherein said spar is fabricated from graphite fiber based material wrapped about said rigid base member and bonded back to back with an adhesive agent, and said rigid base member is formed from a moldable material and is bonded to said shell halves with an adhesive agent.

23. A lightweight load bearing blade subassembly as recited in claim 22 wherein said rigid base member is molded from an epoxy resin material containing chopped fibers selected from the group consisting of metal fiber, graphite fiber, Kevlar fiber and mixtures thereof.

24. A lightweight load bearing blade subassembly as recited in claim 20 wherein a lightweight foam filler is disposed within additional hollow internal cavity defined by said intermediate torsion box member.

* * * * *